United States Patent
Hansson

(10) Patent No.: US 10,138,068 B2
(45) Date of Patent: Nov. 27, 2018

(54) POWERED ROLLER SYSTEMS AND METHODS

(71) Applicant: TECH-ROLL INC., Blaine, WA (US)

(72) Inventor: Ulf Goran Hansson, Blaine, WA (US)

(73) Assignee: TECH-ROLL INC., Blaine, WA (US)

( * ) Notice: Subject to any disclaimer, the term of this patent is extended or adjusted under 35 U.S.C. 154(b) by 0 days.

(21) Appl. No.: 16/004,698

(22) Filed: Jun. 11, 2018

(65) Prior Publication Data

US 2018/0290835 A1  Oct. 11, 2018

Related U.S. Application Data

(63) Continuation of application No. 15/238,623, filed on Aug. 16, 2016, now Pat. No. 9,994,398.

(51) Int. Cl.
  *B65G 23/08* (2006.01)
  *B65G 39/09* (2006.01)

(52) U.S. Cl.
  CPC ............ *B65G 23/08* (2013.01); *B65G 39/09* (2013.01)

(58) Field of Classification Search
  CPC ............................... B65G 23/08; B65G 39/09
  USPC ........................ 198/780, 781.01, 781.02, 788
  See application file for complete search history.

(56) References Cited

U.S. PATENT DOCUMENTS 9,994,398 B1 * 6/2018 Hansson ................ B65G 39/09

OTHER PUBLICATIONS

US PG Pub 2014/0284183, Wolters et al., (Sep. 25, 2014).*

* cited by examiner

*Primary Examiner* — Douglas A Hess
(74) *Attorney, Agent, or Firm* — Michael R. Schacht; Schacht Law Office, Inc.

(57) ABSTRACT

A powered roller system is operable in first and second configurations. In the first configuration, rotation of a motor drive shaft is transferred to a first drum member by an adapter collar that engages the drive shaft and the first roller drum assembly. In the first configuration, a first drum bearing assembly supports the first drum member on a motor support shaft, and a distal support assembly supports the first drum shaft. In the second configuration rotation of the drive shaft is transferred to a second drum member by engaging an adapter collar with the drive shaft and an adapter spacer and engaging the adapter spacer with a second drum assembly. In the second configuration, a second drum bearing assembly supports the second drum member on the support shaft, and the distal support assembly supports a second drum shaft.

8 Claims, 16 Drawing Sheets

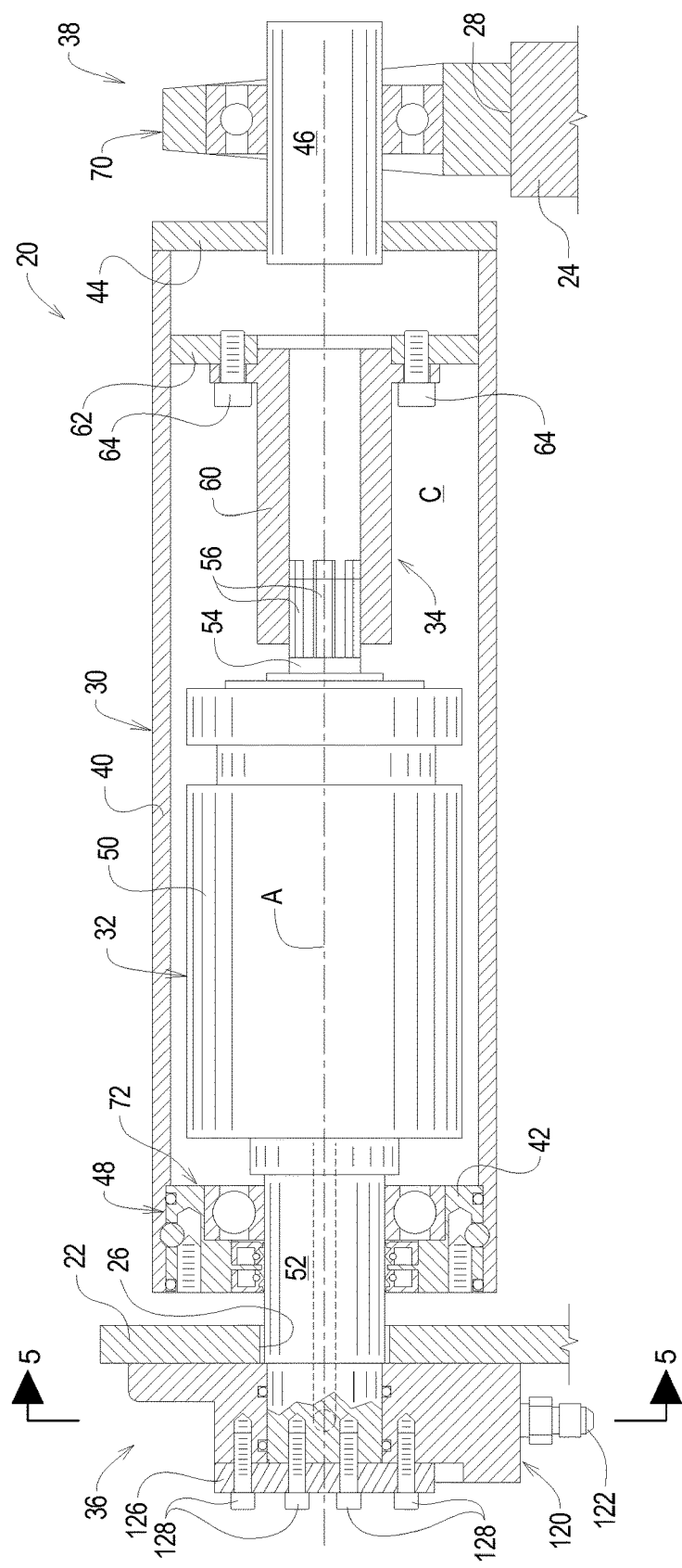

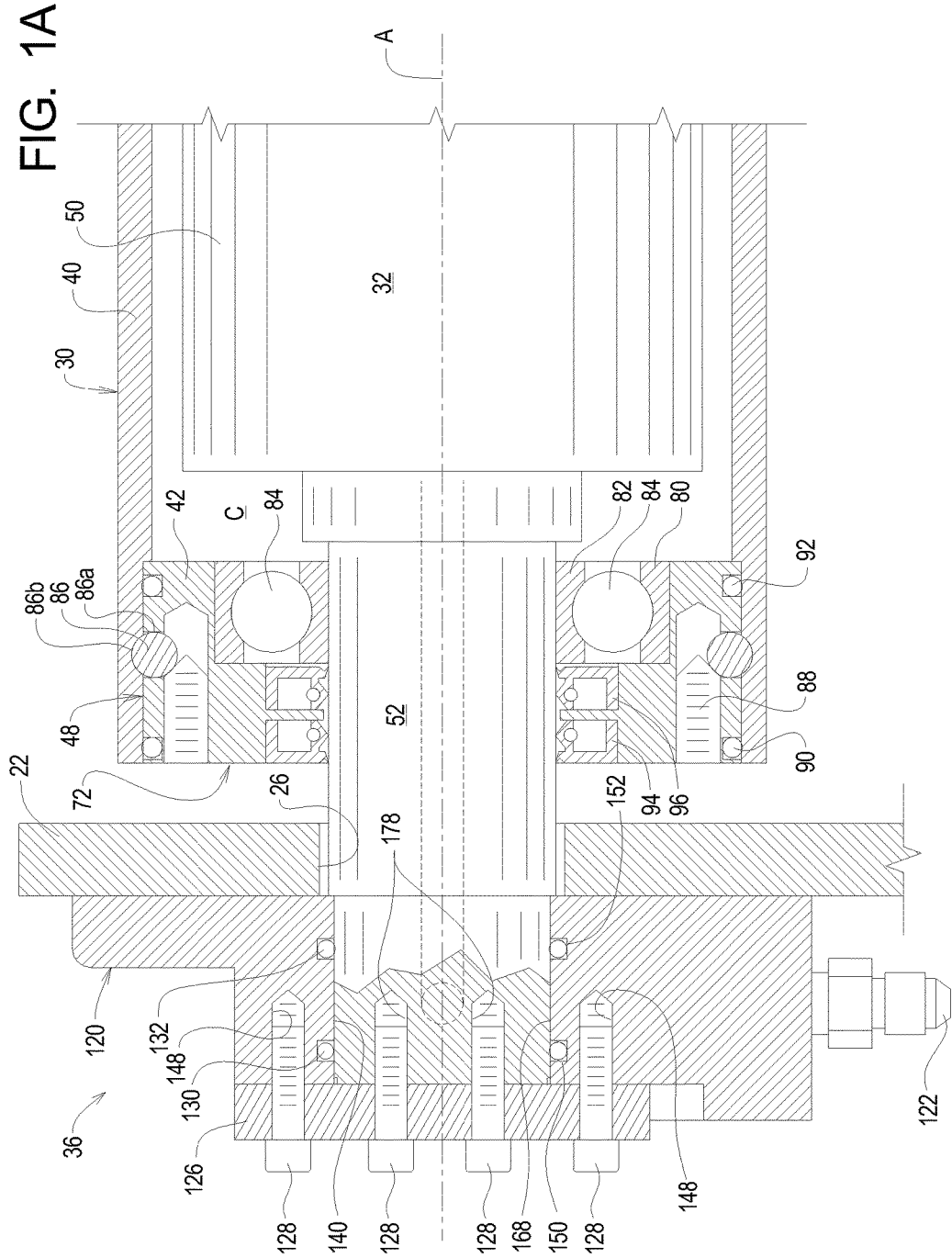

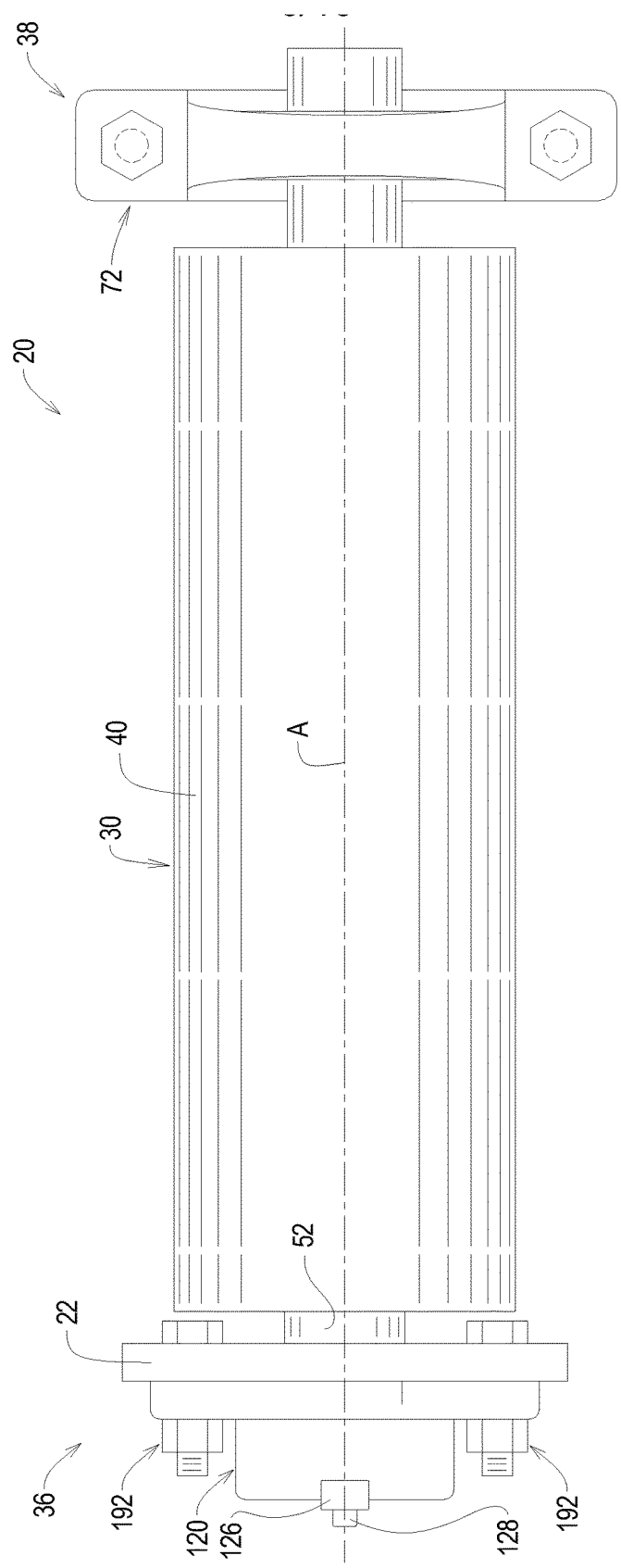

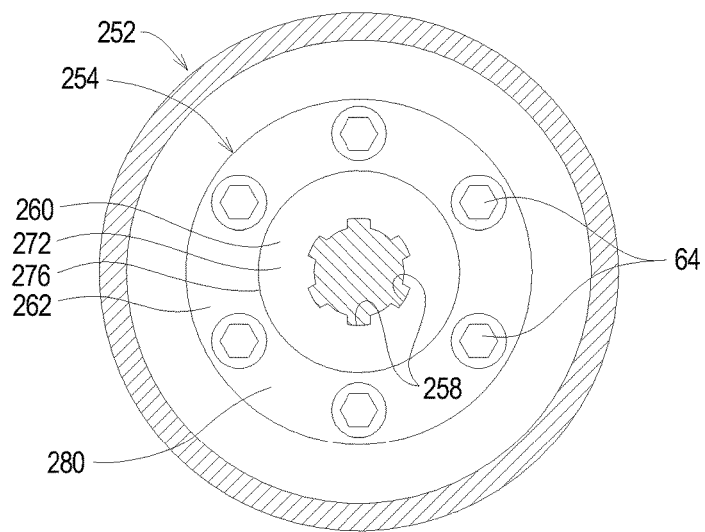
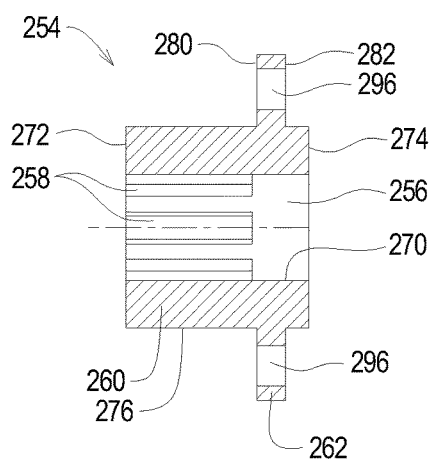
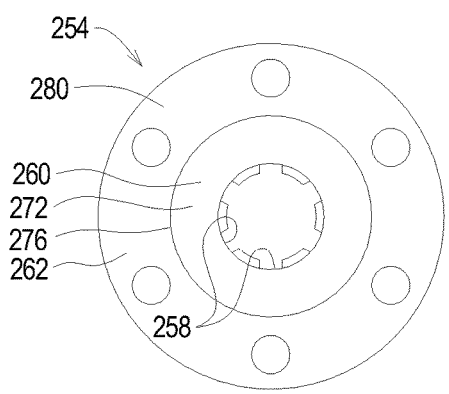

POWERED ROLLER SYSTEMS AND METHODS

RELATED APPLICATIONS

This application, U.S. patent application Ser. No. 16/004,698 filed Jun. 11, 2018 is a continuation of U.S. patent application Ser. No. 15/238,623 filed Aug. 16, 2016, now U.S. Pat. No. 9,994,398, which issued on Jun. 12, 2018, the contents of which are incorporated herein by reference.

TECHNICAL FIELD

The present invention relates to powered rollers and, in particular, to powered rollers having an internal fluid motor to rotate, that rotates a roller drum relative to a support structure.

BACKGROUND

Rollers can be arranged relative to a flexible conveyor or endless-belt system to support the belt as necessary to allow the belt to convey material or objects. Rollers may be passive or powered. The present invention relates to a powered roller that, in addition to supporting the belt, rotates to displace that portion of the belt in contact therewith in a linear direction substantially tangential to the roller surface, and that application of the present invention will be described herein in detail. However, the principles of the present invention may be applied to powered rollers for use in operating environments other than conveyor or endless-belt systems.

A common type of powered roller employs a fluid motor arranged within a roller drum. The motor is secured to a fixed motor support shaft at one end that is supported by a first external bearing. The motor drive shaft is secured to the interior surface of the roller drum by a drive flange. The roller drum is supported at a proximal end by a roller bearing that engages the fixed motor support shaft and at a distal end by a second external bearing. The first and second external bearings are configured to support the roller drum in a desired spatial relationship relative to an external structure.

Fluid such as hydraulic fluid is introduced into the fluid motor through the first external bearing and the fixed motor shaft such that the fluid motor causes rotation of the roller drum relative to the external structure. When used as part of a conveyor assembly, the conveyor belt rests on the external surface of the roller drum such that rotation of the roller drum causes linear displacement of the conveyor belt.

The need exists for hydraulic roller systems and methods capable of easy installation and that allow the adaptation of a given fluid motor to roller drums of different dimensions.

RELATED ART

U.S. Pat. No. 6,125,993 to Hansson discloses a powered roller including an internal fluid motor.

SUMMARY

The present invention may be embodied as a powered roller system comprising first and second roller drum assemblies, a motor, an adapter assembly, and proximal and distal support assemblies. The first roller drum assembly comprises a first drum member, a first drum shaft, and a first drum bearing assembly. The second roller drum assembly comprises a second drum member, a second drum shaft, and a second drum bearing assembly. The motor comprises a support shaft and a drive shaft. The adapter assembly is capable of connecting the drive shaft to the first roller drum assembly and to the second roller drum assembly. The adapter assembly comprising an adapter collar and an adapter spacer. The proximal support assembly supports the support shaft. The distal support assembly is capable of supporting the first drum shaft and the second drum shaft. The powered roller system is operable in first and second configurations. In the first configuration, to transfer rotation of the drive shaft to the first drum member, the adapter collar engages the drive shaft and the first roller drum assembly. In the first configuration, the first drum bearing assembly supports the first drum member on the support shaft, and the distal support assembly supports the first drum shaft. In the second configuration, to transfer rotation of the drive shaft to the second drum member, the adapter collar engages the drive shaft and the adapter spacer and the adapter spacer engages the second drum assembly. In the second configuration, the second drum bearing assembly supports the second drum member on the support shaft, and the distal support assembly supports the second drum shaft.

The present invention may also be embodied as a powered roller system comprising a roller drum assembly, a motor, an adapter assembly, and proximal and distal support assemblies. The roller drum assembly comprises a drum member, a drum shaft, and a drum bearing assembly. The motor comprises a support shaft and a drive shaft. The drum bearing assembly is arranged to support the drum member on the support shaft. The adapter assembly comprises an adapter collar and an adapter spacer. The proximal support assembly for supporting the support shaft. The distal support assembly for supporting the drum shaft. The adapter collar is connected to the drive shaft and to the roller drum assembly through the adapter spacer.

The present invention may also be embodied as a powered roller system comprising a roller drum assembly, a motor, a proximal support assembly, and a distal support assembly. The roller drum assembly comprises a drum member, a drum shaft, and a drum bearing assembly. The motor comprises a support shaft and a drive shaft. The drum bearing assembly is arranged to support the drum member on the support shaft. The proximal support assembly supports the drum shaft. The proximal support assembly comprises a support block and first and second O-rings. The support block defines a center bore, first and second fluid bores, and first and second O-ring grooves. The first and second O-rings are arranged within the first and second O-ring grooves, respectively. The first and second fluid bores extend between first and second fluid ports and first and second locations of the center bore. The center bore is sized and dimensioned such that, with the support shaft is arranged within the center bore, the O-rings engage the support shaft to define a sealed area and the first and second locations are within the sealed area. The distal support assembly supports the drum shaft.

The present invention may also be embodied as a method of rotating a drum member relative to first and second structural members comprising the following steps. A motor comprising a support shaft and a drive shaft is provided. A first drum bearing assembly is arranged to support a first drum member on the support shaft. An adapter assembly comprising an adapter collar and an adapter spacer is provided. The adapter collar is connected to the drive shaft and to the first drum member through the adapter spacer. The proximal support assembly is arranged to support the support shaft. A distal support assembly is arranged to support the drum shaft.

BRIEF DESCRIPTION OF THE DRAWINGS

FIG. 1 is a front elevation partial section view of a first example of a powered roller system of the present invention shown in a first configuration and in a first example environment being supported by first and second structural members;

FIG. 1A is an enlargement of a portion of FIG. 1;

FIG. 2 is a top plan view of the first example powered roller system in the first example environment;

FIG. 15 is a section view taken along lines 15-15 in FIG. 14;

FIG. 16 is a side elevation section view of the second example adapter collar;

FIG. 17 is an end elevation view of the second example adapter collar;

DETAILED DESCRIPTION

Figure 3:
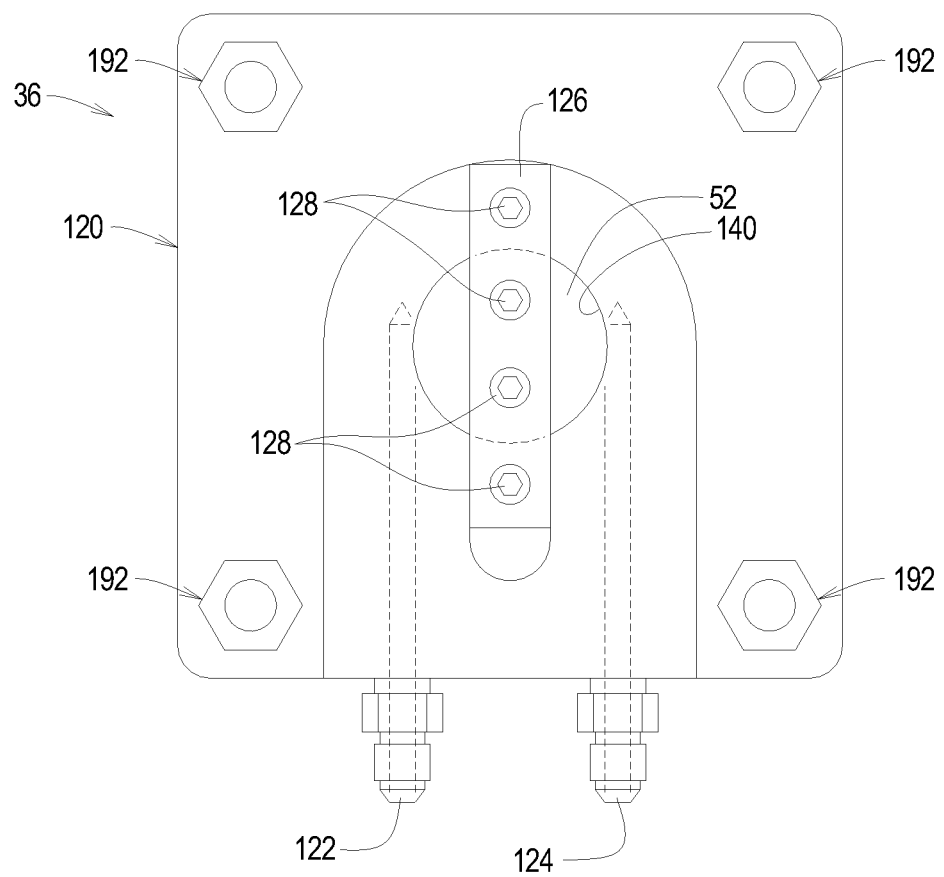
FIG. 3 is a proximal end elevation view of the first example powered roller system in the first example environment.

Referring initially to FIG. 1 of the drawing, depicted therein is a first example powered roller system 20 constructed in accordance with, and embodying, the principles of the present invention. The first example powered roller system 20 is supported by first and second example structural members 22 and 24. The first example structural member is formed by a vertical plate defining a motor support shaft opening 26. The second example structural member 24 defines a horizontal support surface 28.

The first example powered roller system 20 comprises an example roller drum assembly 30, an example motor 32, a first example adapter assembly 34, a first example proximal support assembly 36 supported by the first example structural member 22, and an example distal support assembly 38 supported by the second example structural member 24. In this discussion, the term "distal" refers to a direction closer to the first example proximal support assembly 36 and the term "proximal" refers to a direction closer to the example distal support assembly 38 (opposite the proximal direction).

The example roller drum assembly 30 comprises a first example drum member 40, a proximal end plate 42, a distal end plate 44, a drum shaft 46, and a drum bearing assembly 48. The proximal and distal end plates 42 and 44 are secured to the first example drum member 40 to define a drum chamber C. The drum shaft 46 is rigidly secured to the distal end plate 44 and is coaxial with the first example drum member 40.

The example motor 32 is arranged within the drum chamber C and comprises a motor housing 50, a motor support shaft 52, and a motor drive shaft 54. Drive projections 56 radially extend from the example motor drive shaft 54. The example motor 32 is or may be conventional and will be described herein only to that extent necessary for a complete understanding of the present invention.

The first example adapter assembly 34 comprises an adapter collar 60, an adapter plate 62, and adapter bolts 64. The adapter collar 60 defines an adapter opening 66 defining internal adapter grooves 68. The adapter collar 60 receives the motor drive shaft 54 such that the drive projections 56 are received within the adapter grooves 68 to transfer axial rotation of the motor drive shaft 54 into axial rotation of the adapter collar 60. The example adapter plate 62 is rigidly connected to an inner surface of the first example drum member 40, and the example adapter bolts 64 rigidly connect the adapter collar 60 to the adapter plate 62. Axial rotation of the motor drive shaft 54 is thus transferred through the adapter collar 60 to the first example drum member 40.

The example drum bearing assembly 48 is formed by a roller bearing assembly 70 and a seal assembly 72. The roller bearing assembly 70 is configured to transfer loads from the first example drum member 40 to the motor support shaft 52. The example proximal end plate 42 is detachably attached to the first example drum member 40 to allow for removal and replacement of the motor 32, and the example seal assembly 72 is configured relative to the proximal end plate 42 to seal the proximal end of the drum chamber C. The distal end of the drum chamber C is sealed by the distal end plate 44.

The example motor support shaft 52 extends through the proximal end plate 42 and is supported by the first example proximal support assembly 36. The example drum shaft 46 extends from the distal end plate 44 and is supported for axial rotation by the example distal support assembly 38. The example bearing assembly 48 supports the first example drum member 40 on and for axial rotation relative to the motor support shaft 52. So arranged, the motor support shaft 52, motor drive shaft 54, adapter collar 60, adapter plate 62, first example drum member 40, and drum shaft 46 are all coaxially aligned with a main axis A defined by the first example powered roller system 20, with operation of the motor 32 causing axial rotation of the motor drive shaft 54, adapter collar 60, adapter plate 62, first example drum member 40, and drum shaft 46 about the main axis A.

FIG. 1A illustrates that the example drum bearing assembly 48 comprises first and second bearing rings 80 and 82 and ball bearings 84. The first bearing ring 80 engages the proximal end plate 42, while the second bearing ring 82 engages the motor support shaft 52. The ball bearings 84 are spaced around the axis A to facilitate rotation of the first and second bearing rings 80 and 82, and thus the proximal end plate 42 and motor support shaft 52, relative to each other.

FIG. 1A also shows that one or more lock members 86 are held in lock openings 86a in the proximal end plate 42 and lock cavities 86b in the drum 40 by lock screws 88 to detachably attach the proximal end plate 42 to the drum 40.

FIG. 1A further illustrates that the example seal assembly 72 comprises first and second O-rings 90 and 92 arranged between the proximal end plate 42 and the drum 40 and first and second ring seals 94 and 96 arranged between the proximal end plate 42 and the support shaft 52. The seal assembly 72 inhibits entry of contaminates into the chamber C to prevent contamination of the motor 32 and/or the drum bearing assembly 48.

Turning now to FIGS. 1A-9 of the drawing, the first example proximal support assembly 36 will now be described in further detail.

Figure 5:
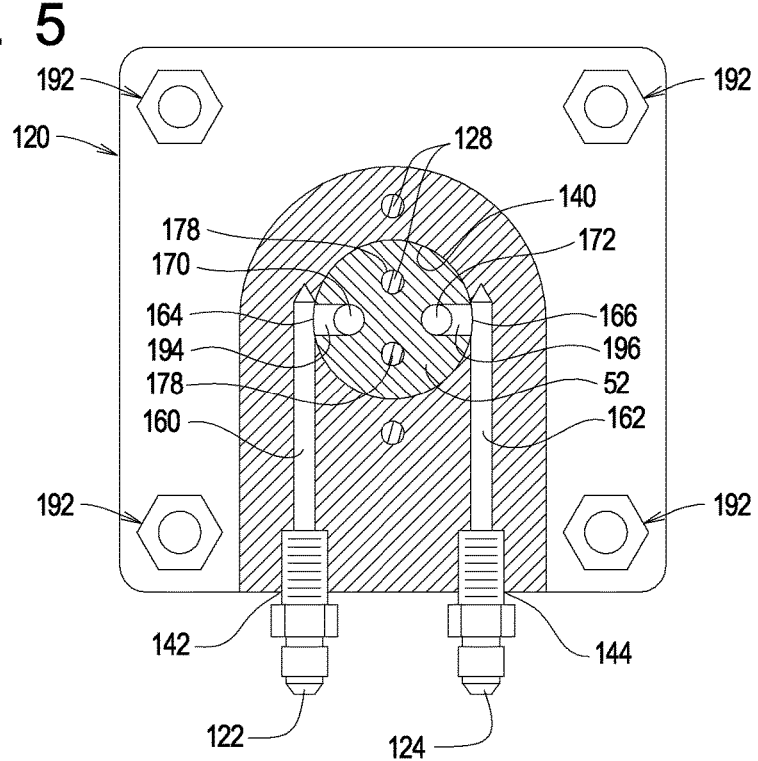
FIG. 5 is a section view taken along lines 5-5 in FIG. 1.

The first example proximal support assembly 36 comprises a support block 120, a first fluid connector 122, a second fluid connector 124, an end bar 126, a plurality of end bar bolts 128, and first and second O-rings 130 and 132. The example support block 120 defines a center bore 140, a first fluid port 142, a second fluid port 144, first and second block bar slot portions 146a and 146b (FIG. 6), a plurality of bolt bores 148, and first and second O-ring grooves 150 and 152 in the center bore. FIG. 5 perhaps best shows that first and second fluid bores 160 and 162 are formed in the support block 120 between the first and second fluid ports 142 and 144 and first and second locations 164 and 166 of the center bore 140. Between the first and second O-ring grooves, a sealed area 168 is formed, and the first and second locations 164 and 166 are within the sealed area 168. FIG. 5 also illustrates that the first and second fluid connectors 122 and 124 are mounted to the first and second fluid ports 142 and 144.

Figure 4:
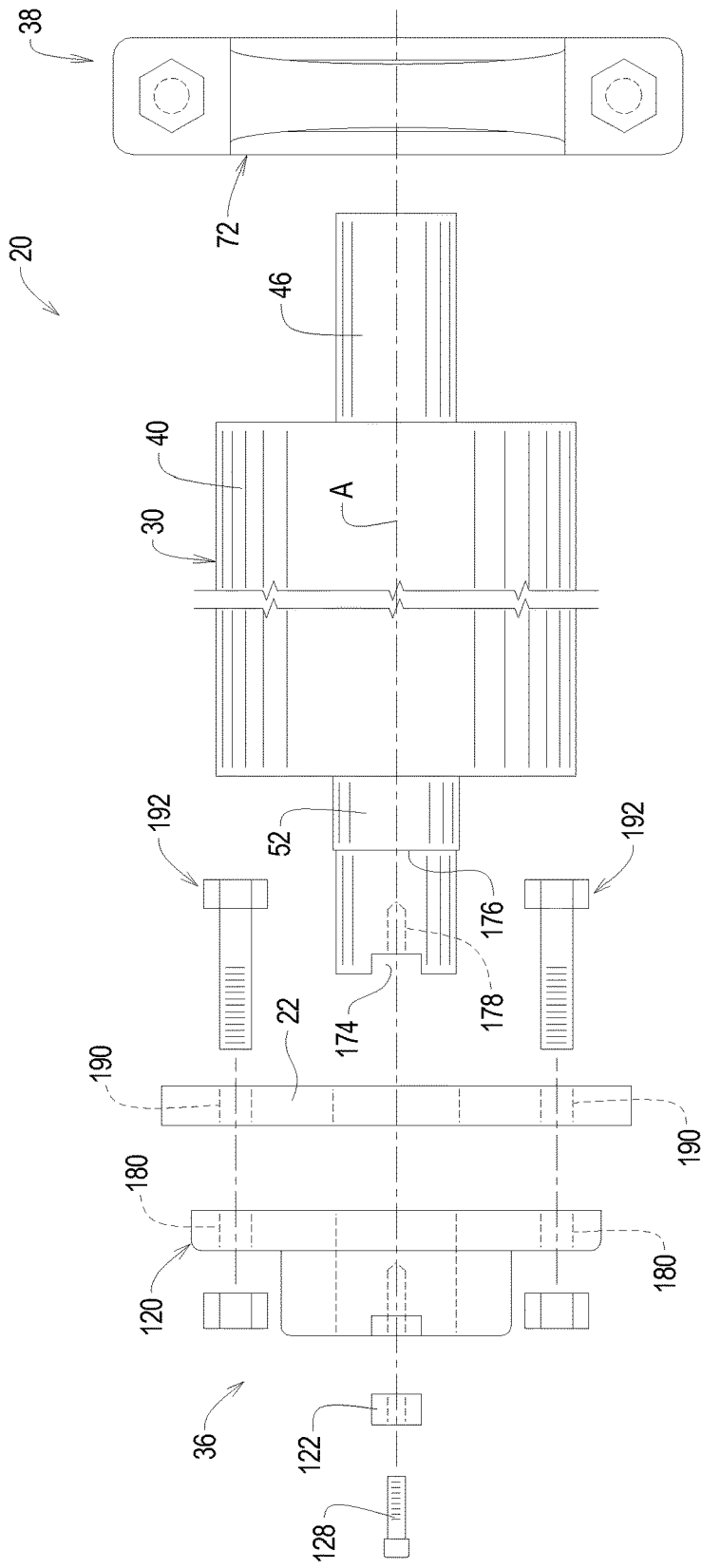
FIG. 4 is a top plan exploded view of the first example powered roller system in the first example environment.
Figure 6:
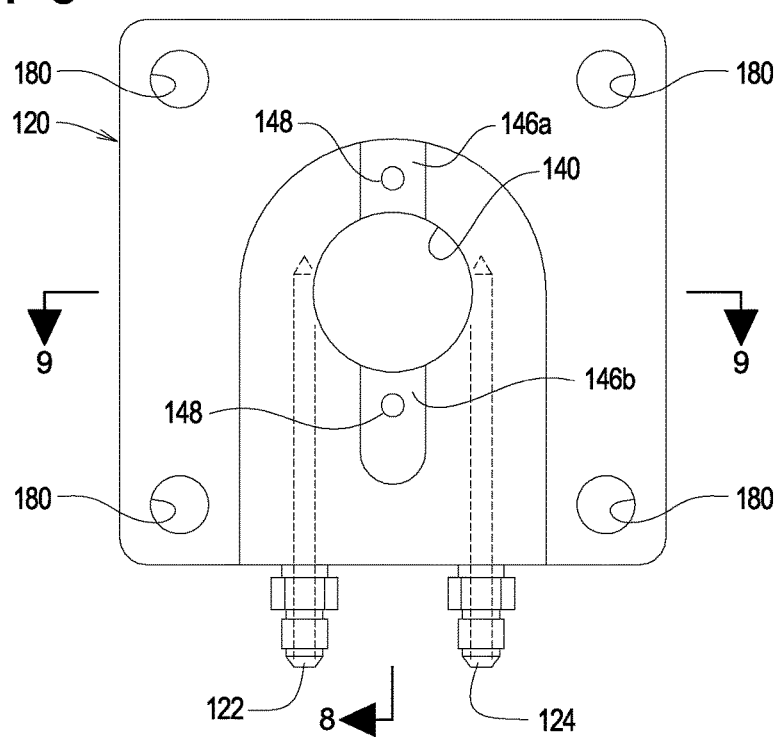
FIG. 6 is an end elevation view of a first example support block assembly of an example first external bearing of the first example powered roller system.
Figure 7:
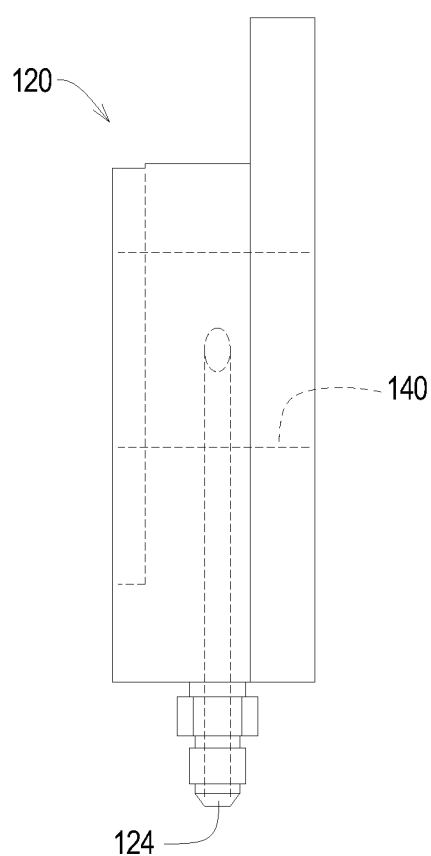
FIG. 7 is a side elevation view of the first example support block assembly.

FIGS. 4 and 5 illustrate that the motor support shaft 52 defines first and second fluid passageways 170 and 172, a support shaft bar slot portion 174, a step surface 176, a plurality of bolt bores 178. FIGS. 4 and 6 illustrate that a plurality of block mounting holes 180 are formed in the example support block 120 and that corresponding structural mounting holes 190 are formed in the example first structural member 22. A bolt assembly 192 is provided for each corresponding pair of block mounting holes 180 and structural mounting holes 190.

Figure 8:
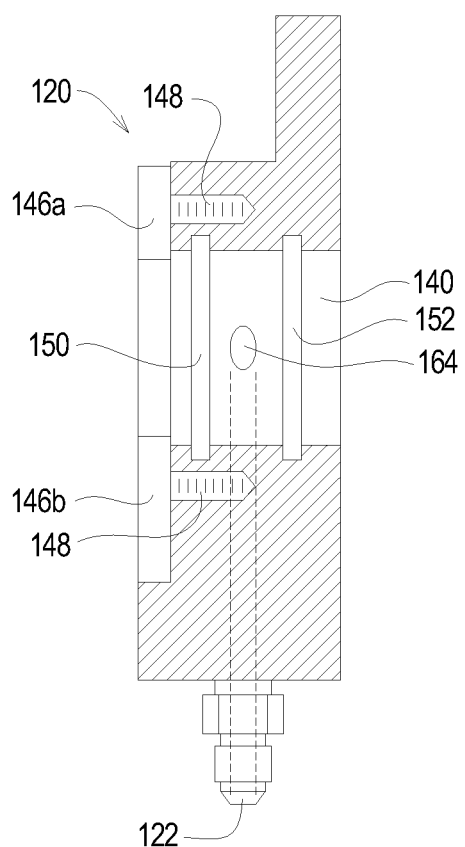
FIG. 8 is a section view taken along lines 8-8 in FIG. 6.
Figure 9:
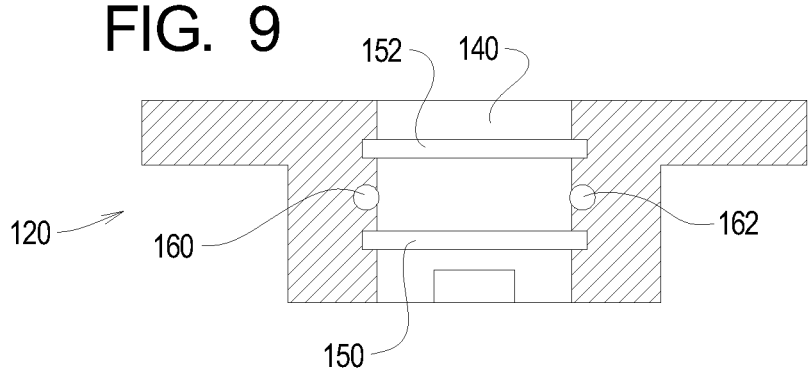
FIG. 9 is a section view taken along lines 9-9 in FIG. 6.

As perhaps best shown in FIGS. 5, 8, and 9, the example first and second locations 164 and 166 are arranged on opposite sides of the center bore 140 and between the first and second O-ring grooves 150 and 152. More generally, the first and second locations 164 and 166 will be spaced from each at least one of: along a longitudinal axis of the center bore 140 and/or angularly about the longitudinal axis of the center bore 140. Stated alternatively, the first and second locations are arranged on opposite sides of a plane extending through a longitudinal axis of the center bore 140.

In use, the first and second O-rings 130 and 132 are arranged within the O-ring groove 150 and 152, respectively. The first support block 120 is bolted to the first structural member 22 using the bolt assemblies 192. A proximal end of the motor support shaft 52 is then inserted through the motor support shaft opening 26 in the first structural member 22 and into the center bore 140 of the support block 120 until the support shaft bar slot portion 174 is aligned with the first and second block bar slot portions 146a and 146b. The end bar 126 is then secured within the aligned bar slot portions 174, 146a, and 146b using the end bar bolts 128. In particular, the end bar bolts 128 are threaded into the threaded block bolt bores 148 formed in the support block 120 and the threaded shaft bolt bores 178 formed in the motor support shaft 52.

When the end bar 126 secures the support shaft 52 to the support block 120 as described above, the first and second locations 164 and 166 at which the first and second fluid bores 160 and 162 are in fluid communication with the center bore 140 are also aligned with radial bores 194 and 196 formed in the motor support shaft 52. These first and second radial bores 194 and 196 thus allow fluid communication between the fluid passageways 170 and 172 and the first and second fluid bores, respectively. Fluid such as hydraulic fluid may thus be forced along a circuit through either one of the fluid passageways 170 and 172, through the motor 32 and back out of the other one of the fluid passageways 170 and 172. The flow of fluid through such a circuit energizes the motor 32, causing the motor 32 to rotate the drum member 40 as described in further detail below.

With the proximal support assembly 36 as described above, the first and second fluid connectors 122 and 124 may be connected to an external fluid source (not shown), and with appropriate valving, may be used to energize the motor 32 to drive the motor drive shaft 54 such that the first example drum member 40 rotates about the system axis A relative to the structural members 22 and 24.

As shown in FIGS. 5 and 6, the structure of the example support block 120 and first and second O-rings 130 and 132 allow the example fluid bores 160 and 162 to be parallel to and spaced from each other. In particular, longitudinal axes defined by the fluid bores 160 and 162 are parallel but are different (not coaxially aligned) such that the first and second fluid connectors 122 and 124 are accessible from the same (in this case bottom) edge of the support block 120. The fluid bores 160 and 162 may also be arranged such that they are not parallel to each other. This arrangement of fluid bores 160 and 162 and fluid connectors 122 and 124 can simplify installation and maintenance of the first example powered roller system 20 in some operating environments.

Turning now to FIGS. 10-13 of the drawing, the example drum bearing assembly 48 will now be described in further detail.

Figure 10:
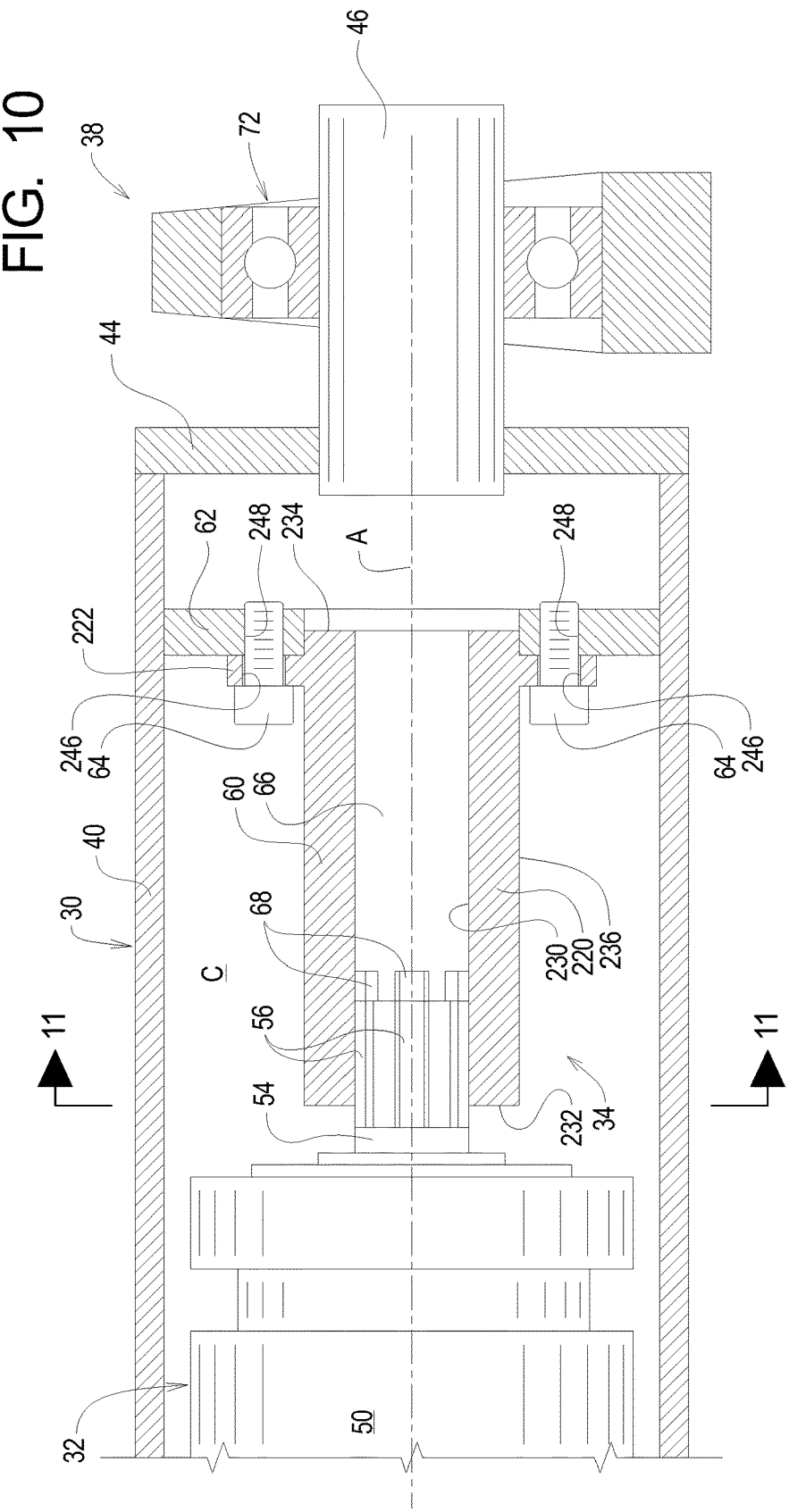
FIG. 10 is a top plan partial section view depicting a portion of the first example powered roller system.

FIG. 10 illustrates that the example adapter collar 60 is configured to extend between the motor drive shaft 54 and the adapter plate 62. The example motor 32 is or may be conventional and, as a practical matter, can be purchased off-the-shelf in a variety of configurations. For the purpose of the first example powered roller system 20 for use with a conveyor or endless-belt system, the use of a standardized motor can be advantageous. The example adapter collar 60 is thus the only component of the first example adapter assembly 34 that must be altered to allow a standard size motor be used in a variety of sizes of drum members 40.

Figure 11:
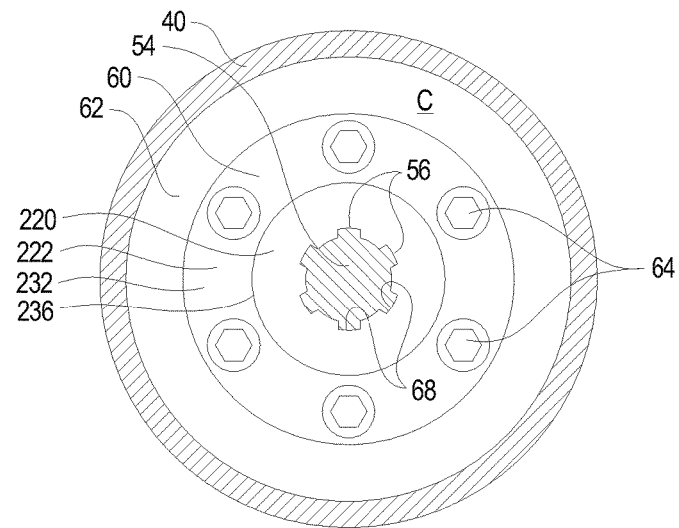
FIG. 11 is a section view taken along lines 11-11 in FIG. 10.
Figure 12:
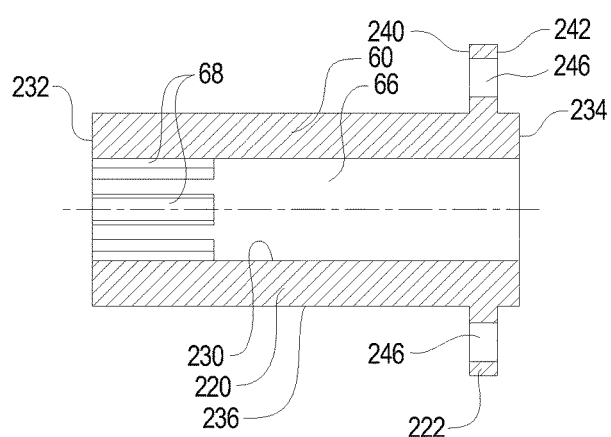
FIG. 12 is a side elevation section view of the first example adapter collar used by the first example powered roller system.
Figure 13:
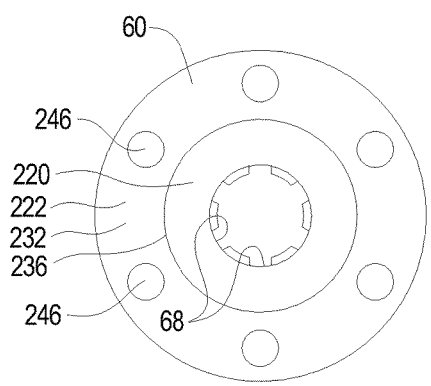
FIG. 13 is an end elevation view of the first example adapter collar.

As perhaps best shown in FIGS. 11-13, the first example adapter collar 60 comprises an elongate member 220 and a mounting flange 222. In the first example adapter collar 60, an inner surface 230 of the elongate member 220 defines the adapter opening 66, which extends from a proximal end 232 to a distal end 234 of the elongate member 220. The internal adapter grooves 68 formed in the inner surface 230 and extend from the proximal end 232 at least partly towards the distal end 234 along the longitudinal axis of the elongate member 220.

The example mounting flange 222 is an annular disc that radially extends from an outer surface 236 of the elongate member 220 and is spaced adjacent to the distal end 234. The mounting flange 222 thus defines a proximal portion 240 and a distal portion 242 of the adapter collar 60.

As perhaps best shown in FIG. 10, the distal portion 242 of the adapter collar 60 is sized and dimension to be received within a plate opening 244 formed in the adapter plate 62. With the distal portion 242 so received within the plate opening 244, the mounting flange 222 is against the adapter plate 62 such that flange bolt openings 246 in the mounting flange 222 may be aligned with plate bolt openings 248 formed in the adapter plate 62. The example adapter bolts 64 are inserted through the flange bolt openings 246 and threaded into the plate bolt openings 248 to secure the mounting flange 222, and thus the first example adapter collar 60, to the adapter plate 62.

Referring now to FIGS. 14-17, depicted therein is a second example powered roller system 250 comprising a second example drum member 252 and a second example adapter collar 254 defining an adapter opening 256 and internal adapter grooves 258. The second example powered roller system 250 is similar to the first example powered roller system 20 described above and thus will not be described herein beyond the extent necessary for a complete understanding of the present invention.

The second example adapter collar 254 comprises an elongate member 260 and a mounting flange 262. An inner surface 270 of the elongate member 260 defines the adapter opening 256, which extends from a proximal end 272 to a distal end 274 of the elongate member 260. The internal adapter grooves 258 are formed in the inner surface 270 and extend from the proximal end 272 at least partly towards the distal end 274 along the longitudinal axis of the elongate member 260.

The example mounting flange 262 is an annular disc that radially extends from an outer surface 276 of the elongate member 260 and is spaced a short distance from the distal end 274. The mounting flange 262 thus defines a proximal portion 280 and a distal portion 282 of the adapter collar 254.

Figure 14:
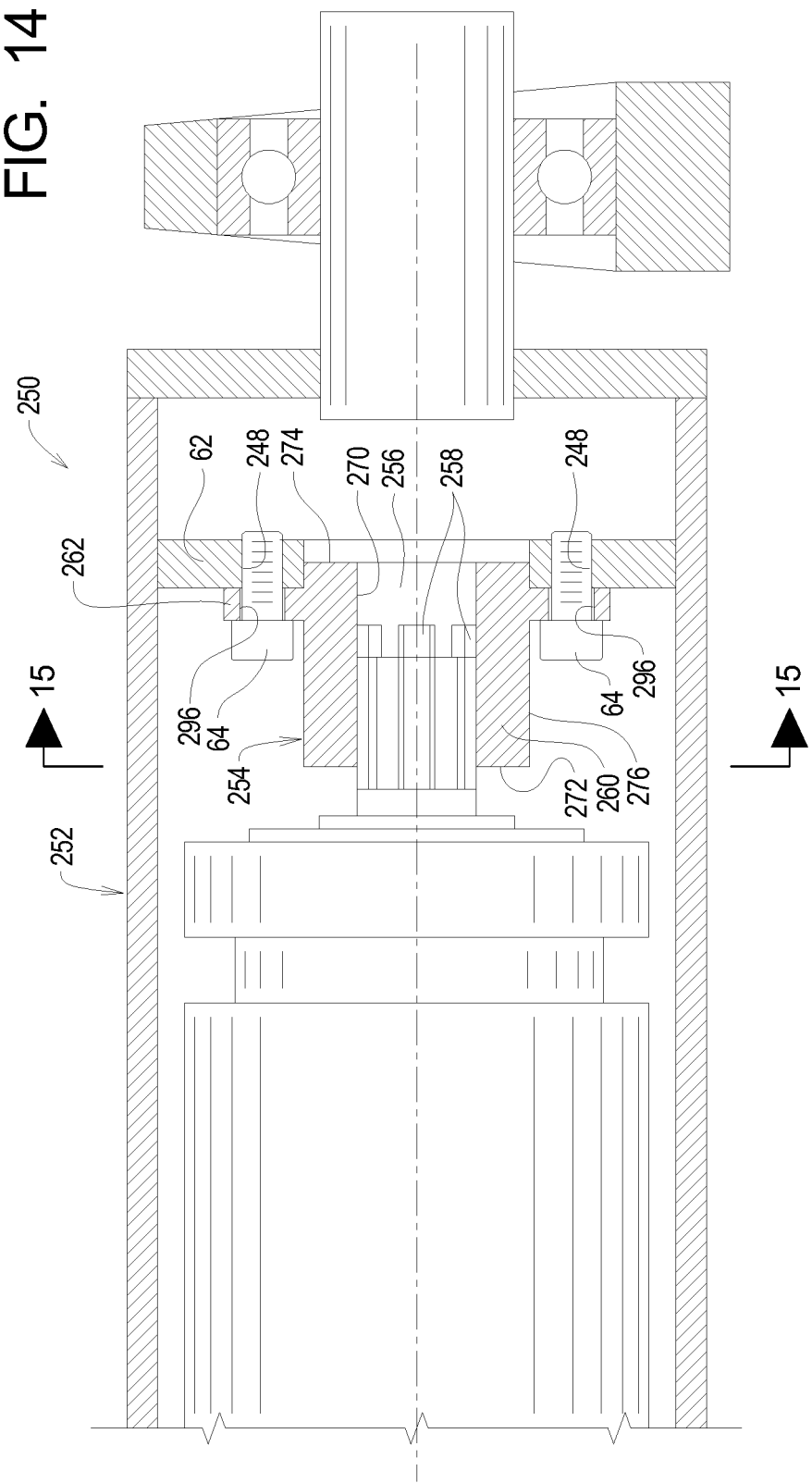
FIG. 14 is a side elevation partial section view of a portion of a second example powered roller system using a second example adapter collar.

As shown in FIG. 14, the distal portion 282 of adapter collar 254 is sized and dimension to be received within the plate opening 244 formed in the adapter plate 62. With the distal portion 292 so received within the plate opening 244, the mounting flange 262 is against the adapter plate 62 such that flange bolt openings 296 in the mounting flange 262 may be aligned with the plate bolt openings 248 formed in the adapter plate 62. The example adapter bolts 64 are inserted through the flange bolt openings 296 and threaded into the plate bolt openings 248 to secure the mounting flange 262, and thus the second example adapter collar 252, to the adapter plate 62.

As can be seen by a comparison of FIGS. 10 and 14, the proximal portion 290 of the second example adapter collar 254 is shorter than the proximal portion 240 of the first example adapter collar 60. Assuming that the motor 32 used by the second example powered roller system 250 is the same size as the motor 32 used by the first example powered roller system 20, at least a length dimension of the second example drum member 252 is different than a length dimension of the first example drum member 40. Using adapter collars of differing dimensions, a system designer can easily adapt the same motor 32 for use with both the first example roller system 20 and the second example powered roller system 250.

FIGS. 18-22 depict a third example powered roller system 320 comprising a comprising an example adapter spacer 322 and spacer bolts 324. The second example powered roller system 250 is similar to the first and second example powered roller systems 20 and 250 described above and thus will not be described herein beyond the extent necessary for a complete understanding of the present invention.

The adapter spacer 322 is configured to be used with the second example collar member 254 and the example adapter plate 62 and either of the first example drum member 40 and the second example drum member 252. More specifically, the example adapter spacer 322 is configured to be arranged between the second example collar member 254 and the adapter plate 62 to allow the second example collar member 254 to be used to accommodate different drum members. In particular, the collar member 254 may be directly connected to the adapter plate 62 when the second example drum member 252 is used (FIG. 14) and may be connected to the adapter plate through the adapter spacer 322 when the drum member 40 is used (FIG. 11).

As shown in FIGS. 19-22, the example adapter spacer 322 is a generally cylindrical member defining a through hole 330, a collar cavity 332, a plate projection 334, a plurality of spacer collar bores 336, and a plurality of spacer plate bores 338. The example through hole 330 extends from a proximal end 340 to a distal end 342 of the example adapter spacer 322. The collar cavity 332 is formed in the proximal end 340 around the through hole 330. The plate projection 334 is formed on the distal end 342 around the through hole 330. The example spacer collar bores 336 are threaded bores formed in proximal end 340 of the adapter spacer 322 around the through hole 330. The example spacer plate bores 338 are holes that are arranged around the through hole 330 and that extend from the proximal end 340 to the distal end 342 of the adapter spacer 322. The spacer plate bores 338 define a proximal bore portion 344 and a distal bore portion 346 separated by an intermediate surface 348.

The radial and angular spacing of the spacer collar bores 336 are the same as those of the spacer plate bores 338. The radial and angular spacing of the bores 336 and 338 is also the same as the radial and angular spacing of the flange bolt openings in the mounting flange 222 of the first example adapter collar 60 and the plate bolt openings 248 in the adapter plate 62. The spacer collar bores 336 are angularly offset from the spacer plate bores 338 around the through hole 330 relative to a longitudinal axis of the adapter spacer 322.

Figure 18:
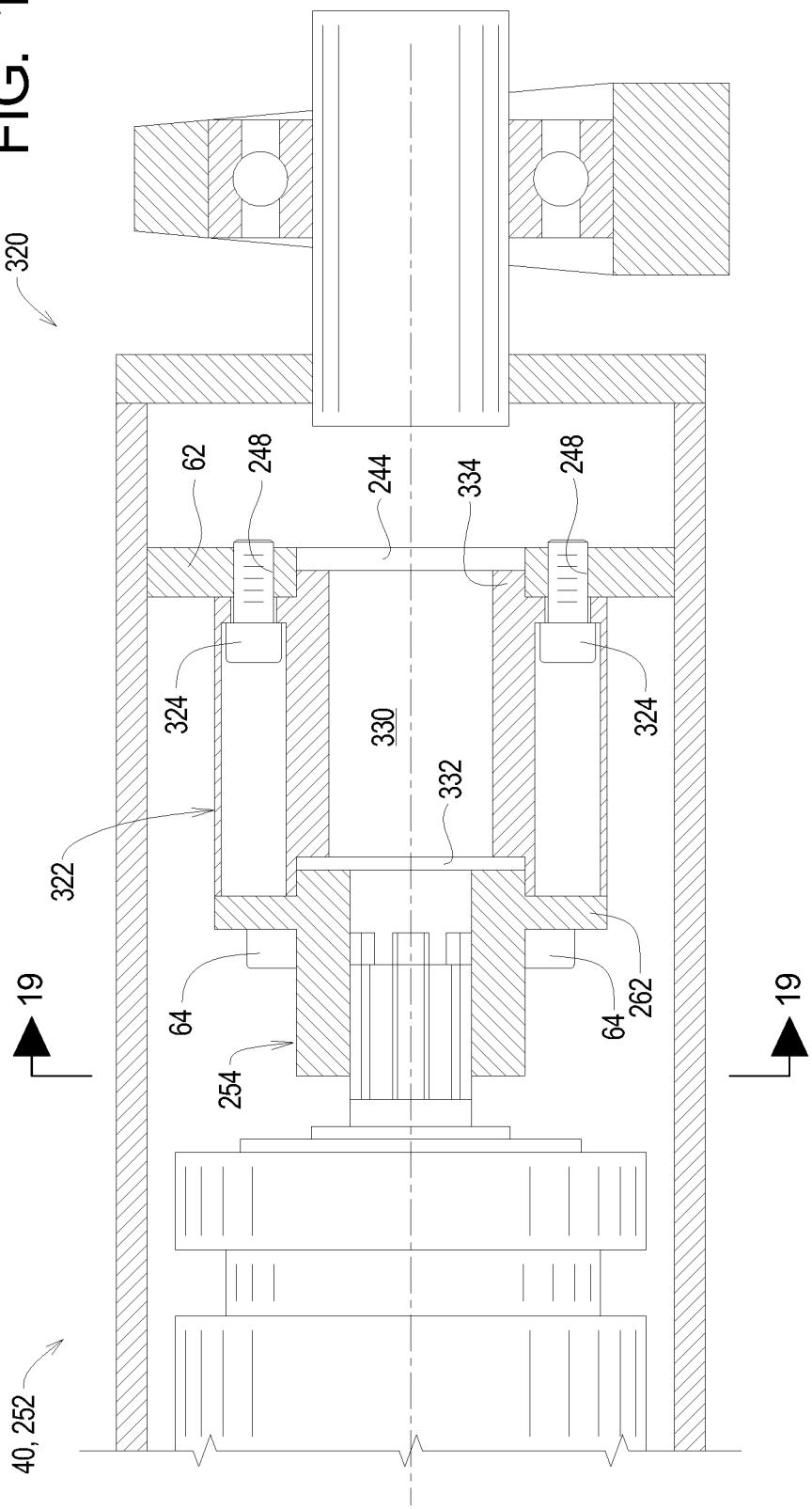
FIG. 18 is a side elevation partial section view of a portion a third example powered roller system using an example collar adapter assembly.
Figure 19:
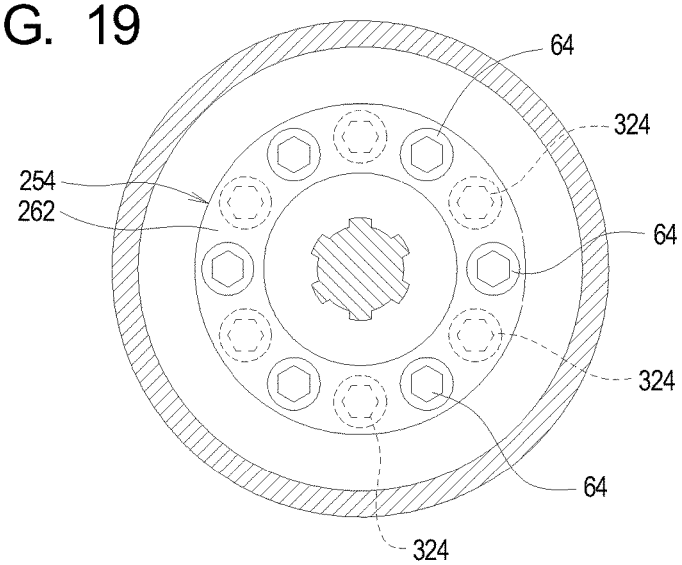
FIG. 19 is a section view taken along lines 19-19 in FIG. 18.
Figure 20:
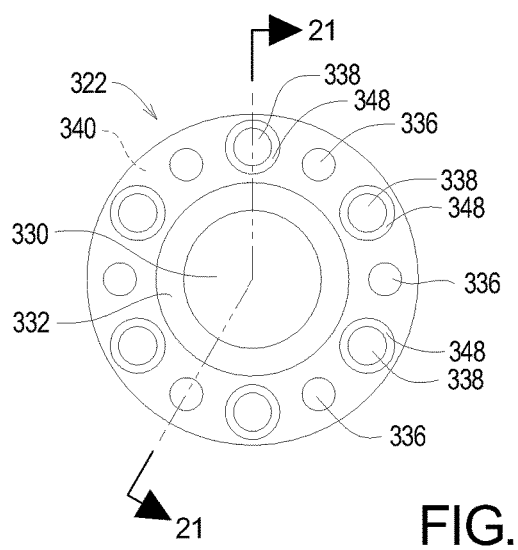
FIG. 20 is a first end elevation view of a first example extension collar used by the example collar assembly.
Figure 21:
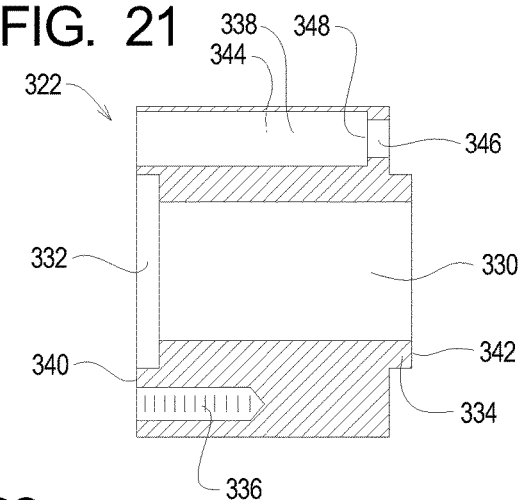
FIG. 21 is a section view of the first example extension collar taken along lines 21-21 in FIG. 20.
Figure 22:
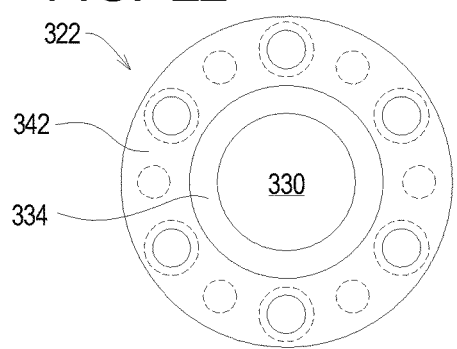
FIG. 22 is a second end elevation view of the first example extension collar.
Figure 23:
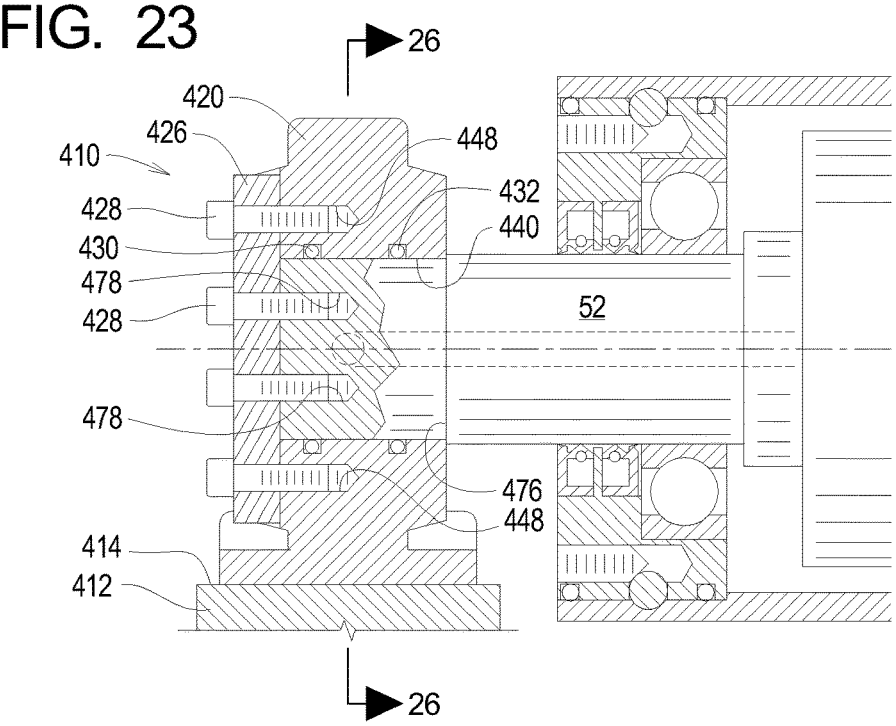
FIG. 23 is an enlarged front elevation partial section view of a portion of a fourth example powered roller system of the present invention shown in a second example environment being supported by third and fourth structural members.
Figure 24:
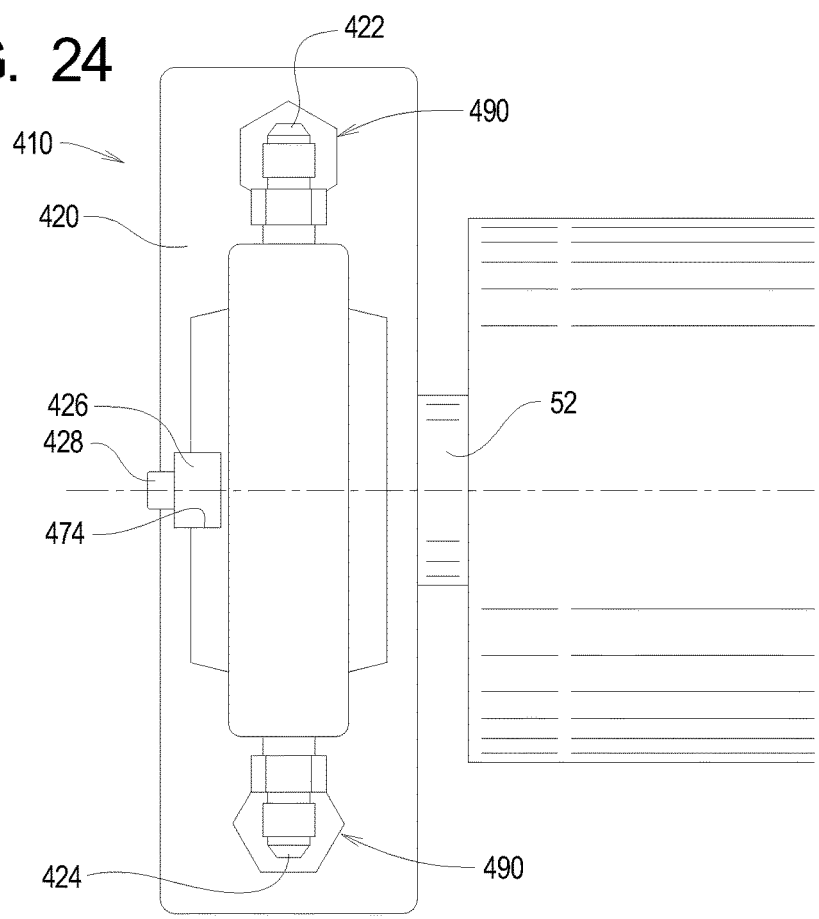
FIG. 24 is a top plan view of a portion of the second example powered roller system.
Figure 25:
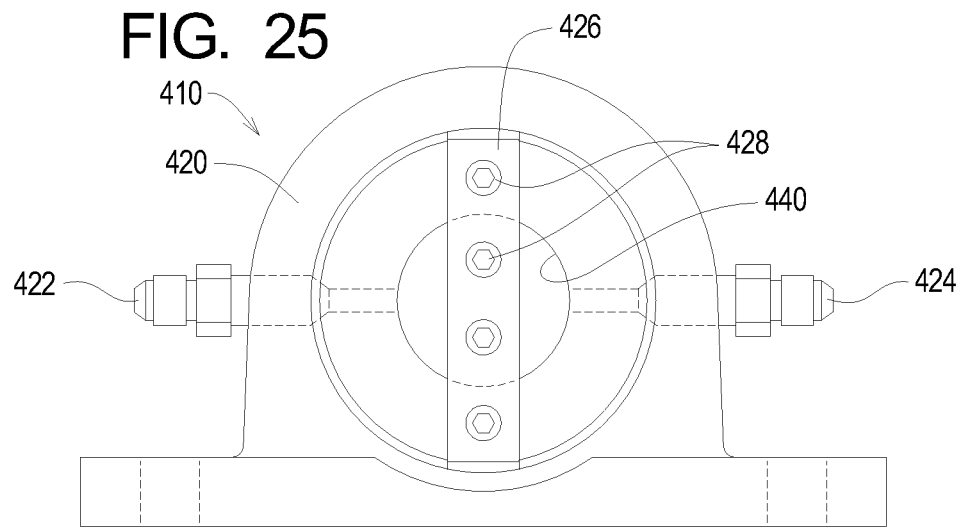
FIG. 25 is an end elevation view of the fourth example powered roller system.
Figure 26:
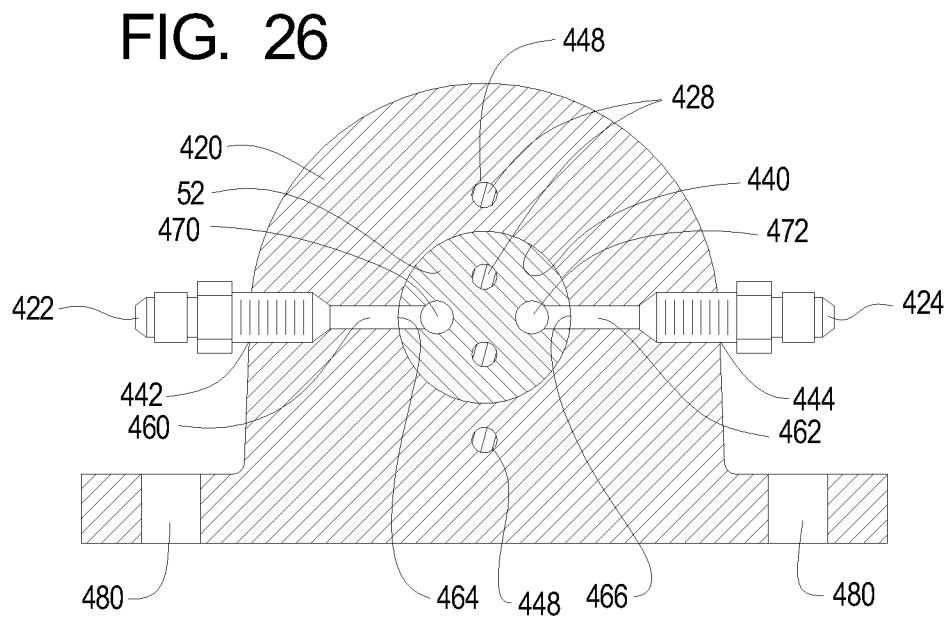
FIG. 26 is an end elevation section view taken along lines 26-26 in FIG. 23.
Figure 27:
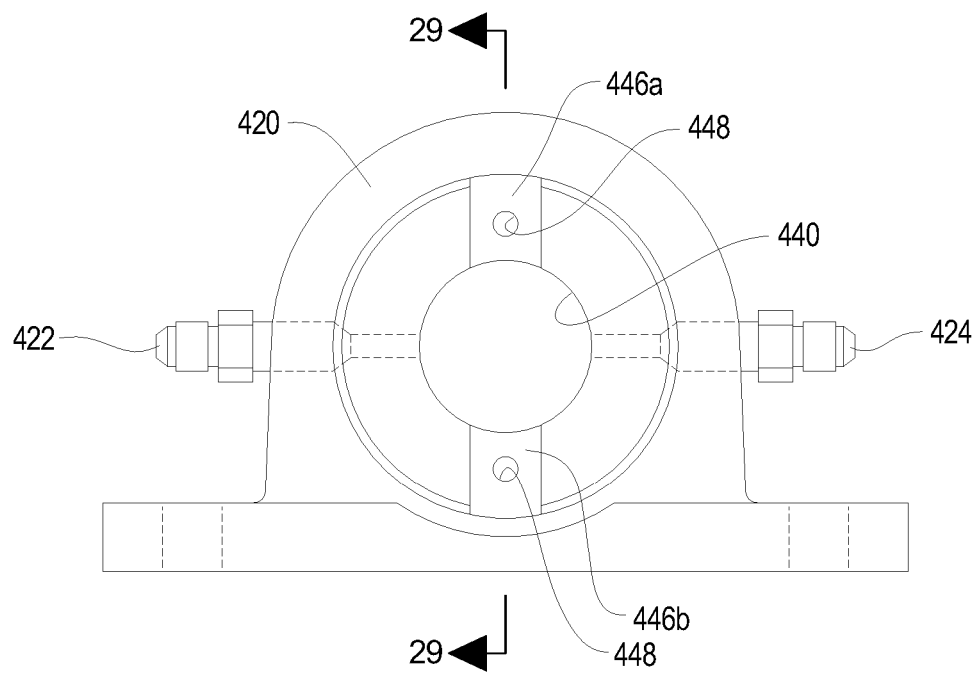
FIG. 27 an end elevation view of a second example support block assembly of the fourth example powered roller system.
Figure 28:
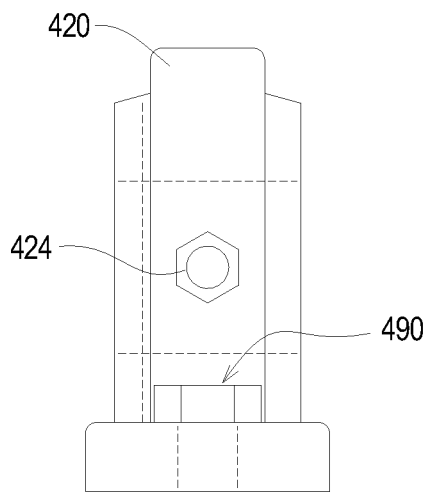
FIG. 28 is a side elevation view of the second example support block assembly.
Figure 29:
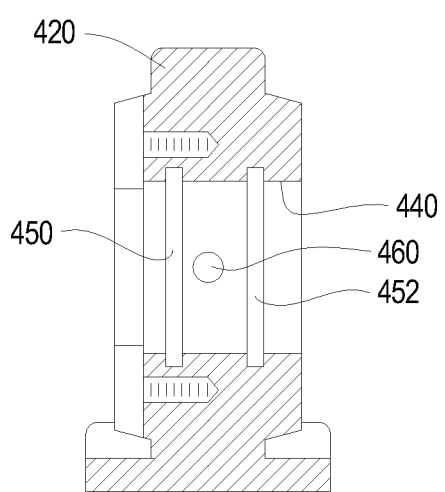
FIG. 29 is a section view taken along lines 29-29 in FIG. 27.

As shown in FIGS. 18 and 19, the spacer bolts 324 are inserted through the spacer plate bores 338 and threaded into the plate bolt openings 248 with the plate projection 334 within the plate opening 244 in the adapter plate 62 to secure the adapter spacer 322 to the adapter plate 62. The head of the spacer bolts 324 is within the proximal bore portion 344 and against the intermediate surface 348 when the spacer bolts 324 are fully tightened. At this point, the distal portion 242 of the adapter collar 254 is arranged within the collar cavity 332, and the example adapter bolts 64 are inserted through the flange bolt openings 296 and threaded into the spacer collar bores 336 to secure the mounting flange 262 to the adapter spacer 322. The second example adapter collar 254 is thus rigidly secured to the adapter plate 62 through the adapter spacer 322.

As can be seen by a comparison of FIGS. 10, 14, and 18, assuming that the motor 32 used by the third example powered roller system 320 is the same size as the motors 32 used by the first and second example powered roller systems 20 and 250, at least a length dimension of the second example drum member 252 is different than a length dimension of the first example drum member 40. Using an appropriate length of adapter spacer 322, a system designer can easily adapt the same motor 32 for use with both the first example roller system 20 and the third example powered roller system 320.

Turning now to FIGS. 23-29, depicted therein is a second proximal support assembly 410 that may be used in place of the first example proximal support assembly 36 described above. The second proximal support assembly 410 is adapted to be mounted on a structural member 412 defining a substantially horizontal structural surface 414.

The second example proximal support assembly 410 comprises a support block 420, a first fluid connector 422, a second fluid connector 424, an end bar 426, a plurality of end bar bolts 428, and first and second O-rings 430 and 432. The example support block 420 defines a center bore 440, a first fluid port 442, a second fluid port 444, first and second block bar slot portions 446a and 446b (FIG. 27), a plurality of bolt bores 448, and first and second O-ring grooves 450 and 452 in the center bore. First and second fluid bores 460 and 462 are formed in the support block 420 between the first and second fluid ports 442 and 444 and first and second locations 464 and 466 of the center bore 440. The example first and second locations 464 and 466 are arranged on opposite sides of the center bore 440 and between the first and second O-ring grooves 450 and 452. The first and second fluid connectors 422 and 424 are mounted to the first and second fluid ports 442 and 444.

The motor support shaft 52 defines first and second fluid passageways 470 and 472, a support shaft bar slot portion 474, a step surface 476, a plurality of bolt bores 478. A plurality of block mounting holes 480 are formed in the example support block 420, and corresponding structural mounting holes (not shown) are formed in the example first structural member 22. A bolt assembly 490 is provided for each corresponding pair of block mounting holes 480 and structural mounting holes.

In use, the first and second O-rings 430 and 432 are arranged within the O-ring grooves 450 and 452, respectively. The first support block 420 is bolted to the first structural member 22 using the bolt assemblies 490. A proximal end of the motor support shaft 52 is then inserted into the center bore 440 of the support block 420 until the support shaft bar slot portion 474 is aligned with the first and second block bar slot portions 446a and 446b. The end bar 426 is then secured within the aligned bar slot portions 474, 446a, and 446b using the end bar bolts 428. In particular, the end bar bolts 428 are threaded into the threaded block bolt bores 448 formed in the support block 420 and the threaded shaft bolt bores 478 formed in the motor support shaft 52.

So assembled, the first and second fluid connectors 422 and 424 may be connected to an external fluid source (not shown), and with appropriate valving, may be used to energize the motor 32 to drive the motor drive shaft 54 such that the first example drum member 40 rotates about the system axis A relative to the structural members 22 and 24.

As shown in 25-27, the structure of the example support block 420 and first and second O-rings 430 and 432 allows the example fluid bores 460 and 462 to be coaxially aligned with each other on opposite sides of the motor support shaft 52. The first and second fluid connectors 422 and 424 are thus accessible from opposite side edges of the support block 420. This arrangement of fluid bores 460 and 462 and fluid connectors 422 and 424 can simplify installation and maintenance of the first example powered roller system 20 in certain operating environments, such as operating environments in which the structural surface is similar to the horizontal structural surface 414.

What is claimed is:
1. A powered roller system comprising:
   a roller drum assembly comprising a drum member, a drum shaft, and a drum bearing assembly;
   a motor comprising a support shaft and a drive shaft, where the drum bearing assembly is arranged to support the drum member on the support shaft;
   a proximal support assembly for supporting the drum shaft, the proximal support assembly comprising
      a support block defining center bore, first and second fluid bores, and first and second O-ring grooves;
      first and second O-rings arranged within the first and second O-ring grooves, respectively, wherein
      the first and second fluid bores extend between first and second fluid ports and first and second locations of the center bore;
      the center bore is sized and dimensioned such that, with the support shaft is arranged within the center bore, the O-rings engage the support shaft to define a sealed area and the first and second locations are within the sealed area; and
   a distal support assembly for supporting the drum shaft.
2. A powered roller system as recited in claim 1, in which the first and second fluid bores define first and second fluid bore axes, where the first and second fluid bore axes are parallel to each other and the first and second fluid bore axes are different.
3. A powered roller system as recited in claim 1, in which the first and second fluid bores define first and second fluid bore axes, where the first and second fluid bore axes are parallel to each other and aligned.
4. A powered roller system as recited in claim 1, in which the first and second locations are arranged on opposite sides of the center bore.
5. A method of rotating a drum member comprising the steps of:
   providing a roller drum assembly comprising a drum member, a drum shaft, and a drum bearing assembly;
   providing a motor comprising a support shaft and a drive shaft;
   arranging the drum bearing assembly to support the drum member on the support shaft;
   providing a proximal support assembly comprising
      a support block defining a center bore, first and second fluid bores, and first and second O-ring grooves, and
      first and second O-rings arranged within the first and second O-ring grooves, respectively,
      wherein the first and second fluid bores extend between first and second fluid ports and first and second locations of the center bore, and
      wherein the center bore is sized and dimensioned such that with the support shaft arranged within the center bore, the O-rings engage the support shaft to define a sealed area, and the first and second locations are within the sealed area; and supporting the drum shaft with a proximal support assembly;

supporting the drum shaft with a distal support assembly.

6. A method as recited in claim 5, in which the first and second fluid bores define first and second fluid bore axes, where the first and second fluid bore axes are parallel to each other and the first and second fluid bore axes are different.

7. A method as recited in claim 6, in which the first and second fluid bores define first and second fluid bore axes, where the first and second fluid bore axes are parallel to each other and aligned.

8. A method as recited in claim 5, further comprising the step of arranging the first and second locations on opposite sides of the center bore.

* * * * *